United States Patent [19]

Kawase

[11] Patent Number: 4,914,805
[45] Date of Patent: Apr. 10, 1990

[54] METHOD OF MANUFACTURING A MAGNETIC HEAD HAVING A PLURALITY OF MAGNETIC GAPS

[76] Inventor: Masahiro Kawase, 74-5, Ohaza Kamikagemori, Chichibu-shi, Saitama-ken, Japan

[21] Appl. No.: 365,096

[22] Filed: Jun. 12, 1989

Related U.S. Application Data

[62] Division of Ser. No. 151,430, Feb. 2, 1988, abandoned.

[30] Foreign Application Priority Data

Feb. 10, 1987 [JP] Japan .................................. 62-029050

[51] Int. Cl.[4] .............................................. G11B 5/42
[52] U.S. Cl. ..................................... 29/603; 360/121
[58] Field of Search .................. 29/603; 360/118, 119, 360/121, 122, 110

[56] References Cited

FOREIGN PATENT DOCUMENTS

| 54024 | 3/1984 | Japan | 360/121 |
| 20113 | 1/1987 | Japan | 360/118 |
| 22213 | 1/1987 | Japan | 360/118 |

Primary Examiner—Carl E. Hall

[57] ABSTRACT

In the magnetic head having, in the magnetic recording medium sliding surface, a first magnetic gap followed by a second magnetic gap in the medium sliding direction, the medium sliding surface is provided with a plurality of parallel grooves to each other extending obliquely with respect to the medium sliding direction, and the positions of the first and second magnetic gaps on the medium sliding surface are defined by the plurality of grooves.

12 Claims, 6 Drawing Sheets

METHOD OF MANUFACTURING A MAGNETIC HEAD HAVING A PLURALITY OF MAGNETIC GAPS

This is a division of application Ser. No. 151,430, filed Feb. 2, 1988, now abandoned.

BACKGROUND OF THE INVENTION

1. Field of the Invention

This invention relates to magnetic heads and, more particularly, to magnetic heads provided, in the magnetic recording medium sliding surface, with a first magnetic gap followed in the medium sliding direction by a second magnetic gap.

2. Description of the Related Art

Below, in this written specification, description is made by taking as the device of this kind an example of the so-called tunnel erase type magnetic head used in the apparatus for recording or reproducing digital signals on a disc-shaped magnetic recording medium.

Figure 1:
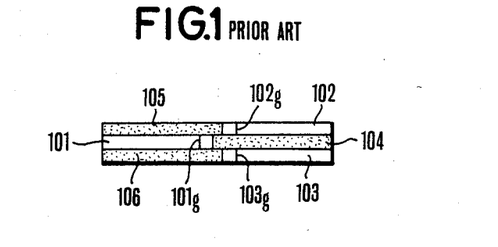
FIG. 1 is a view schematically illustrating the medium sliding surface of the conventional magnetic head core.
Figure 2:
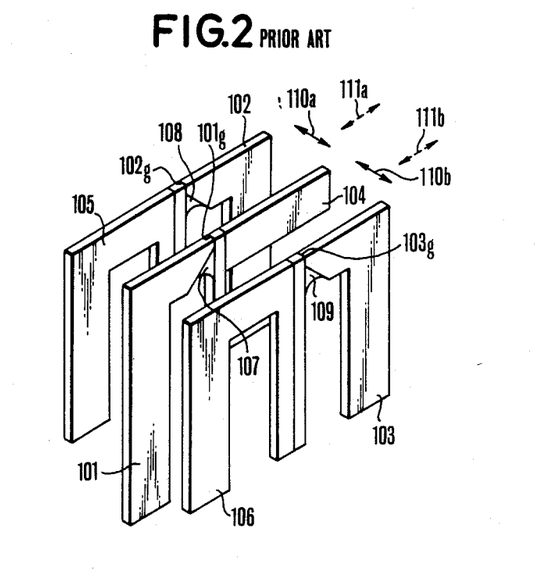
FIG. 2 is a view illustrating one step in the production process for the magnetic head core of FIG. 1.
Figure 3:
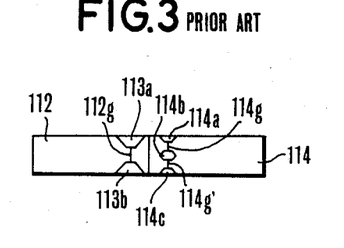
FIG. 3 is a view schematically illustrating the medium sliding surface of the other conventional magnetic head core.
Figure 4:
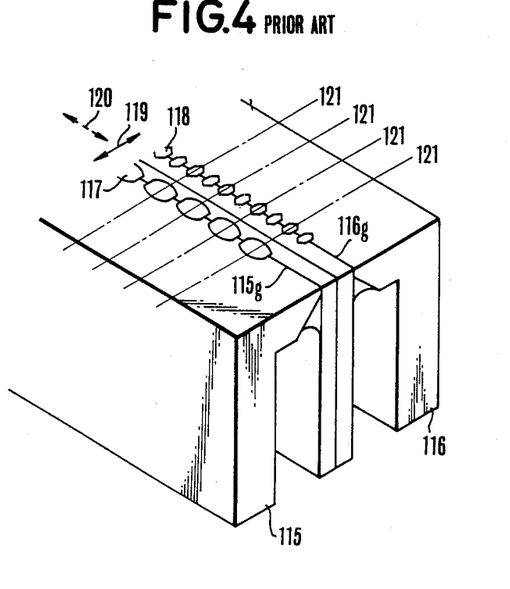
FIG. 4 is a view illustrating one step in the production process for the magnetic head core of FIG. 3.

FIGS. 1 and 3 are for explaining the structures of the cores of the different conventional tunnel erase type magnetic heads from each other, being top views schematically illustrating the magnetic recording medium sliding surfaces of the magnetic head cores. Also FIG. 2 and FIG. 4 are perspective views for explaining one step of the process for manufacturing the magnetic head cores of FIG. 1 and FIG. 3 respectively.

In FIG. 1, a recording-reproducing core 101 and erasing cores 102 and 103 each are made up of magnetic material such as ferrite, formed to a thin plate like shape and are provided respecitvely with a recording-reproducing gap 101g, and erasing gaps 102g and 103g. Also, spacers 104–106 are made up of non-magnetic material such as ceramic. This magnetic head core is constructed in such a way that, as shown in FIG. 2, a binding unit of the recording-reproducing core 101 and the spacer 104, another binding unit of the erasing core 102 and the spacer 105, and a further binding unit of the erasing core 103 and the spacer 106, totaling three units, are brought into butting each other in the directions indicated by arrows 110a and 110b in the figure, and, after the positions of the gaps 101g, 102g and 103g have been adjusted in directions indicated by arrows 111a and 111b, the three binding units are then joined.

Also, FIG. 3 shows the medium sliding surface of the tunnel erase type magnetic head core of the so-called bulk type.

A recording-reproducing gap 112g is formed in a recording-reproducing core 112 and its track width is defined by glass grooves 113a and 113b formed on either side of it. Two erasing gaps 114g and 114g' are formed in an erasing core 114. The track widths and spacing are defined by glass grooves 114a, 114b and 114c formed on either side of the respective gaps 114g and 114g'. This magnetic head core is constructed in such a way that as shown in FIG. 4, a recording-reproducing core block 115 and an erasing core block 116 are made in separation from each other, brought into butting each other in a direction indicated by an arrow 119 in the figure, and, after adjustment has been made in a direction indicated by an arrow 20 in the figure in order to match the relative positions of the recording-reproducing gap of the core block 115 and the erasing gap of the core block 116, they are joined. After that, cutting is carried out along section lines 121, and the magnetic head core is obtained.

In the magnetic head core shown in FIG. 1, in the production process, cementing of the three core binding units as in the step shown in FIG. 2 is necessary, and it is not easy to accurately control the positional relationship between the gaps 101g, 102g and 103g by adjustment of the directions of the arrows 111a and 111b. Also, in the case when a narrower track is achieved in order to increase the density of record, because the structure becomes so that the individual thicknesses of the cores 101, 102 and 103 are equal to the respective individual track widths, it is required that each core 101–103 is made thinner. For this reason, in the production process, it becomes more difficult to treat each core 101–103, and there is a problem that the yield is deteriorated due to the cause such as cracks or breakage of the core.

Meanwhile, in the head core shown in FIG. 3, it is easy to make a narrower track. But, even in this head core, it is not easy to accurately determine the positional relationship of each gap in such a block state as in FIG. 4. Further, even in each block, the only avoidance on the production is the position error of the magnetic gap. Therefore, in the production process, the control for suppressing the position error in the block of each gap is necessary along with the position coincidence between the above-described blocks. This point is becoming an obstacle to reduction of the production cost.

SUMMARY OF THE INVENTION

This invention has been made with such a problem as has been described above in mind, and is to provide a magnetic head of such structure as to very accurately define the relative position of each gap by a simple method.

Another object of the invention resides in the magnetic head having magnetic gaps to define in position and is to provide a magnetic head of structure capable of being produced by a very simple production process.

Under such an object, according to the present invention, as its one embodiment, a magnetic head is proposed, comprising a magnetic circuit structure having a recording medium sliding surface, the structure having a first magnetic gap and a second magnetic gap arranged in different positions from each other on the sliding direction of a recording medium, and further the structure having a plurality of parallel grooves to each other formed in the sliding surface and extending to an oblique direction with respect to the sliding direction, and the plurality of grooves each being arranged so as to cross at least one of the first and second magnetic gaps.

Other objects than those described above of the invention and its features will become apparent from the following detailed description of embodiments of the invention.

DETAILED DESCRIPTION OF THE PREFERRED EMBODIMENTS

Below, by reference to FIG. 5-FIG. 10, the details of the embodiments of the present invention are described.

Figure 5:
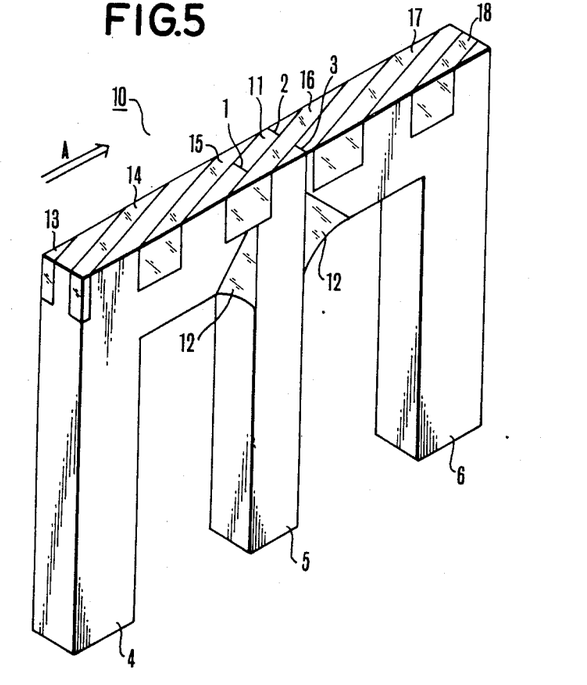
FIG. 5 is a perspective view illustrating the structure of the core body of an embodiment of a magnetic head according to the invention.

FIG. 5 in perspective view shows the structure of the body of an embodiment of a magnetic head core of the tunnel erase type (hereinafter called head core body) according to the present invention. This head core body is generally denoted by a reference numeral 10. The head core body 10 is constructed similarly to the bulk type, comprising three cores 4-6 of the same thickness. The cores 4 and 6 of letter "L" shape are brought into butting the core 5 of letter "I" shape on either side thereof, and these are joined by welding with molten glass 12. The core 4 constitutes a magnetic circuit in which a magnetic flux flows for recording or reproducing purposes, or a recording-reproducin core, together with the core 5 and back cores (not shown) joined to the lower end portions of both cores 4 and 5 in the figure. Also, the core 6 constitutes an erasing core in which a magnetic flux for erasing flows together with the common core 5 for both magnetic circuits for the recording-reproducing and erasing.

The upper surface of the head core body 10 as viewed in the figure is formed as the magnetic recording medium sliding surface 11 (hereinafter abbreviated to the sliding surface) on which a magnetic recording medium (not shown) slides in a direction of arrow A.

A recording-reproducing gap 1 is formed in this sliding surface 11 at the butting surface between the cores 4 and 5, and two erasing gaps 2 and 3 are formed at the butting surface between the cores 5 and 6.

Also, in the sliding surface 11, parallel grooves 13-18 to one another filled with non-magnetic material such as glass are formed obliquely to the medium sliding direction A by cutting with a whetstone.

Of these grooves shown at 13-18, the grooves 15 and 16 determine both ends of the recording-reproducing gap 1, and that groove 16 defines the spacing between the two erasing gaps 2 and 3.

Figure 6:
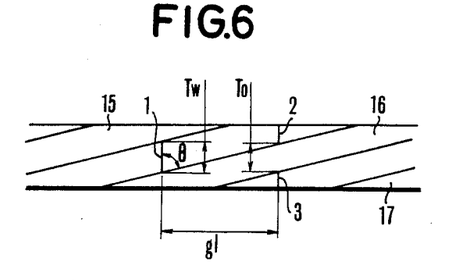
FIG. 6 is a plan view looked from the medium sliding surface of the magnetic head core of FIG. 5.

The relative positions of the recording-reproducing gap 1 and the erasing gap 2 or 3 relative to each other are determined by the angle $\theta$ of the recording-reproducing gap 1 with the groove 16, and it is desirable that that angle $\theta$ is limited to a range of $\theta_1$ to $\theta_2$:

$$\theta_1 = \tan^{-1}(gl/Tw); \theta_2 = \tan^{-1}(gl/To)$$

where, in the diagram in enlarged scale of FIG. 6, gl is the distance from the recording-reproducing gap 1 to the erasing gap 2 or 3; Tw is the width of the recording or reproducing track; To is the width of the tunnel of erasing. For note, the grooves 13, 14, 17 and 18 are the side product in the case when the head core body 10 is taken in the block form to many numbers each track of the adjacent head core is defined and at the same time extended with the result of such grooves. So they have no meanings functionally at all.

A back core (not shown) is joined to the lower end portions in the figure of the cores 4-6 of such a head core body 10 to form a magnetic head core, and further coils for recording-reproducing and erasing are turned on it, and a slider (not shown) is added to form a magnetic head.

According to the structure of such a head core body 10 of this embodiment as above, the relative positions of the recording-reproducing gap 1 and the erasing gap 2 or 3 to each other are defined by the glass grooves 15 and 16, not depending on the butt as in the prior art, and can be defined to high precision accuracy without position error and the width of the recording track can accurately be controlled.

Also, the head core body 10 of this embodiment, similarly to the bulk type tunnel erase type head as shown in FIG. 3, does not have the difficulty of the case of the prior art on the achievement of a narrowed track, and it is easy to make a narrowed track.

Next, the process for producing the head core body 10 of this embodiment is described by reference to FIGS. 7(A)-7(E).

Figure 7A:
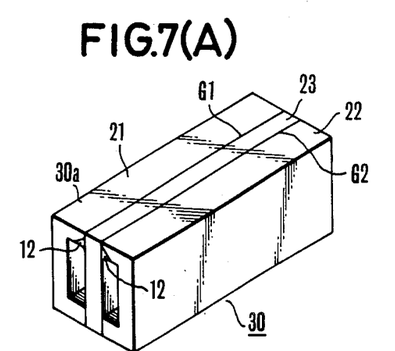
FIGS. 7(A)-7(E) are views illustrating a production process for the magnetic head core of FIG. 5.

In FIG. 7(A), reference numerals 21-23 are magnetic substance pieces formed from a magnetically soft material such as ferrite, each corresponding to a plurality of sets of the cores 4, 5 and 6 of the head core body. In the production process of this embodiment, at first, these magnetic substance pieces 21-23 are butted as shown in the figure, and joined by welding with molten glass 12 to obtain a magnetic substance block 30 from which a plurality of head core bodies 10 can be cut out. At this time, in the magnetic substance block 30, the upper surface 30a in the figure which is to be machined to the above-described sliding surface 11 is given two magnetic gaps G1 and G2 between the magnetic substance pieces 21 and 23 and between the magnetic substance pieces 22 and 23 which are to become the recording-reproducing gap 1 and the erasing gaps 2 and 3 in the head core body 10.

Figure 7B:
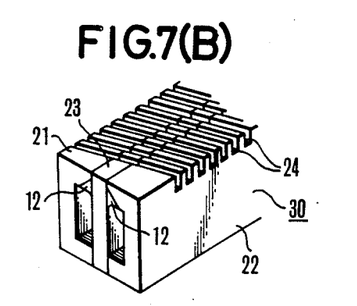
Figure 7C:
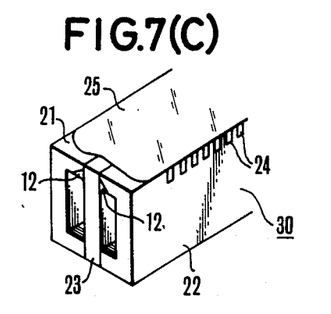

Next, as shown in FIG. 7(B), a plurality of parallel grooves 24 to each other having a prescribed angle $\theta$ with respect to the recording-reproducing gap to determine the width of the recording-reproducing track and the relative position of each gap are formed in the upper surface 30a of the magnetic substance block 30 by grinding with whetstone. Further, as shown in FIG. 7(C), molten glass 25 is poured on the upper surface 30a so that the grooves 24 are sufficiently filled with the glass 25. After that, the unnecessary glass on the upper surface 30a is removed. Then, the surface 30a is finished as shown in FIG. 7(D).

Figure 7D:
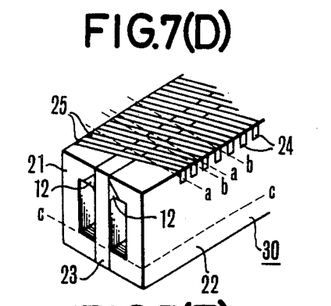

Next, as shown in FIG. 7(D), the magnetic substance block 30 is cut along section lines a, b and c to a prescribed thickness, and the head core bodies 10 of this embodiment are obtained.

Figure 7E:
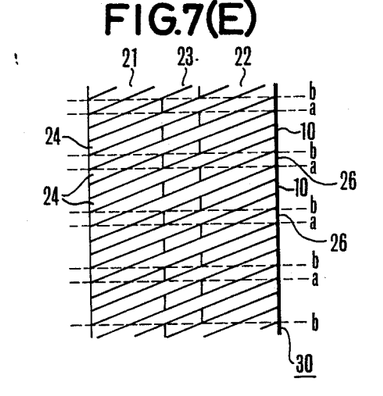

In FIG. 7(E), there is shown an enlarged view of the upper surface 30a of the magnetic substance block 30. The section lines a and b define the thickness of the head core body 10, and the outer edges of the erasing gaps 2 and 3. 26 corresponds to the cut cavity wall of equal thickness to the width of the grinding wheel.

According to such a production process, after the magnetic substance pieces 21-23 have butted each other and have been joined, the glass groove 24 for defining the width of the recording-reproducing track and the relative position of each gap is formed. Therefore, the position adjustment of each gap is not required in that time when the magnetic substance pieces 21-23 butt each other. Therefore, the process is simplified, and a reduction of the production cost is achieved. Also, there is no position error of each magnetic gap 1-3 due to the position error at the butting time. The relative position of each gap 1-3 to each other can be defined to high precision accuracy by the precision accuracy of the machining of the glass groove 24. Therefore, the control of the track width can easily and accurately be performed.

By the way, in the magnetic head core of the embodiment shown in FIG. 5, the outer edges of the erasing gaps 2 and 3 are defined at the same time when the thickness of the head core body 10 is defined as the block 30 is sliced. Therefore, the tolerance in the step of slicing off the head core body 10 governs the accuracy of the erasing gap track width.

Figure 8:
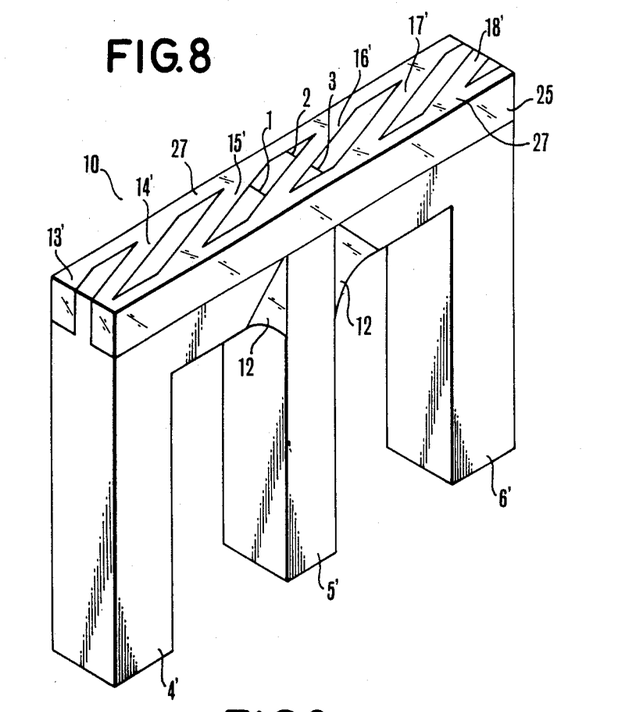
FIG. 8 is a perspective view illustrating the core body of another embodiment of the magnetic head according to the invention.

FIG. 8 is a view illustrating the structure of another embodiment of the magnetic head core body according to the present invention. If, in the slicing step, the accuracy with which the erasing track width is defined is not sufficient, the magnetic head core is made to have such a structure as shown in FIG. 8 and a groove 27 for defining the erasing track is provided. Then, the slicing accuracy for the head core body is not necessarily required.

Figure 9:
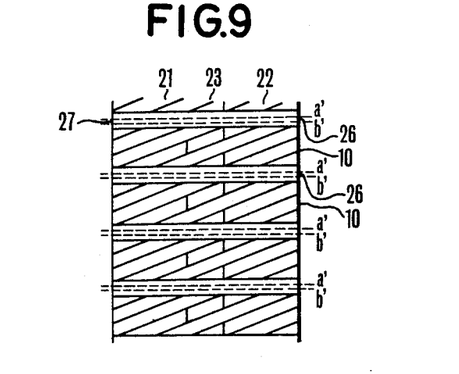
FIG. 9 is a diagram for explaining one step in a production process for the magnetic head core of FIG. 8.

FIG. 9 is a view illustrating one step in the production process for the magnetic head core of FIG. 8. On the production process, next to the step of FIG. 7(B) of the above-described embodiment, for the purpose of defining the track width of the erasing gap, a plurality of parallel grooves 27 elongated to the medium sliding direction are formed, then the grooves 24 and 27 in the upper surface 30a of the magnetic substance block 30 are filled with glass 25, and then slicing is performed along section lines a' and b' inside the groove 27 filled with the glass 25. Thus, such as head as shown in FIG. 8 can be obtained. Also, in the head core body 10 of this embodiment, the magnetic circuits for recording-reproducing and for erasing are connected to each other at the core 5. In such a structure, there is an occasion that when recording, the peak shift due to the crosstalk of the D.C. erasing becomes a problem. To solve this problem, in a perspective view of FIG. 10, there is shown still another embodiment of the magnetic head core according to the present invention.

Figure 10:
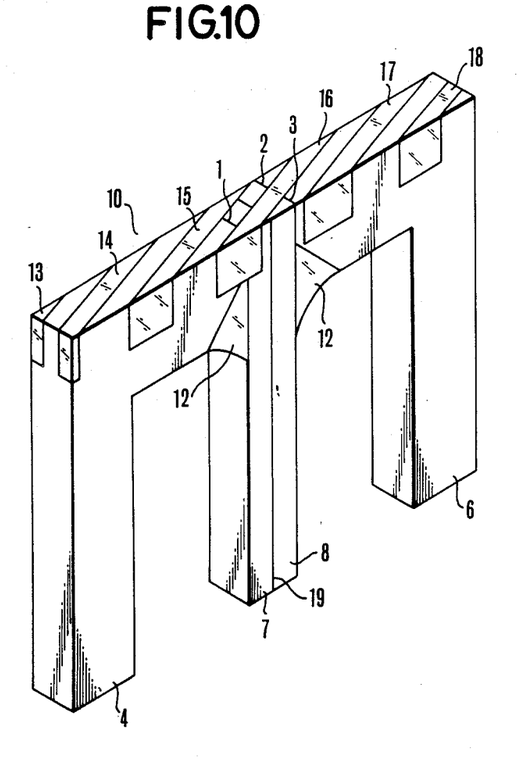
FIG. 10 is a perspective view illustrating the core body of still another embodiment of the magnetic head according to the present invention.

In the structure of the magnetic head core shown in FIG. 10, a central core which corresponds to the core 5 shown in FIG. 5 is separated into a core 7 for the recording-reproducing magnetic circuit and a core 8 for the erasing magnetic circuit by an adhesive agent layer 19 which becomes an insulating layer. By such a structure, the magnetic circuits for recording-reproducing and for erasing are separated from each other so that the above-described problem of peak shift due to the crosstalk can be solved.

As has been described above, in the magnetic head core according to the invention of the present patent application, the relative positions of all the gaps to one another can be defined very accurately. Also, according to the production method of the magnetic head core according to the invention of the present patent application, without increasing the butt accuracy of the magnetic bodies positioned on either side of the magnetic gap, the relative positions of each gap can be defined very accurately. Therefore, the efficiency of operation when manufacturing is improved, and it becomes also possible to realize a lower price of the magnetic head.

I claim:

1. A method of manufacturing a magnetic head, comprising:
   (a) a first step of forming a magnetic circuit structure having a surface for sliding contact with a recording medium and first and second magnetic gaps disposed at positions different in a sliding dirction;
   (b) a second step of forming a plurality of grooves on the surface of said magnetic circuit structure for sliding contact with the recording medium, said grooves extending in oblique direction relative to the direction of sliding and in parallel with each other at constant pitches, thereby forming a plurality of divided parts of the second magnetic gap on said surface of sliding contact with the recording medium; and
   (c) a third step of cutting the magnetic circuit structure, on which said plurality of grooves is formed, into a plurality of magnetic head chips, whereby the plurality of parts of said first magnetic gap are caused to disappear in alternate manner, while the number of the plurality of parts of said second magnetic gap is held unchanged.

2. A method according to claim 1, wherein said third step includes a cutting step of effecting cutting at positions corresponding to alternate ones of the plurality of parts of said first magnetic gap, by means of a cutting tool having cutting width wider than a length of each part of said first magnetic gap.

3. A method according to claim 1, wherein said third step includes a step of forming a plurality of grooves extending in a direction of sliding of the recording medium from positions of alternate parts of said first magnetic gap and each having a width wider than a length of each part of said first magnetic gap and a step of cutting at positions in the grooves in the sliding direction of said medium.

4. A method according to claim 1, wherein said structure includes;
   a first magnetic member located between said first magnetic gap and said second magnetic gap;
   a second magnetic member disposed in opposed relation to said first magnetic member, with said first magnetic gap being located therebetween; and
   a third magnetic member disposed in opposed relation to said first magnetic member, with said second magnetic gap being located therebetween.

5. A method according to claim 1, wherien said structure includes:
   first and second magnetic members located at both sides of said first magnetic gap; and
   third and fourth magnetic members located at both sides of said second magnetic gap.

6. A method according to claim 1, wherein said first magnetic gap is disposed at preceding position to said second magnetic gap in the sliding direction.

7. A method according to claim 6, wherein said second magnetic gap is arranged to effect erasing function to erase signals on said recording medium, and said first magnetic gap is arranged to effect recording function to reproduce signals from said recording medium.

8. A method of manufacturing a magnetic head, comprising:
(a) a first step of forming a magnetic circuit structure having a sliding surface for sliding contact with a recording medium and having a first magnetic gap and a second magnetic gap disposed at positions different in a sliding direction of the recording medium;
(b) a second step of forming a plurality of grooves on the sliding surface of said magnetic circuit structure, said grooves extending in oblique direction relative to the sliding direction and in parallel with each other at constant pitches, thereby forming a plurality of divided parts of said first magnetic gap and said second magnetic gap on said sliding surface; and
(c) a third step of producing a plurality of magnetic head chips by cutting the magnetic circuit structure, on which said plurality of grooves are formed, at positions on alternate parts of the plurality of parts of said first magnetic gap.

9. A method according to claim 8, wherein said third step includes a step of cutting the structure at positions corresponding to alternate parts of said plurality of parts of the first magnetic gap, by means of a cutting tool having a cutting width wider than a length of each of said magnetic gap.

10. A method according to claim 8, wherein the cutting in said third step is affected at a position between two adjacent parts among the plurality of parts of said second magnetic gap.

11. A method manufacturing a magnetic head, comprising:
(a) a first step of forming a magnetic circuit structure having a sliding surface for sliding contact with a recording medium and first and second magnetic gaps disposed at positions different in the sliding direction of the recording medium;
(b) a second step of forming a plurality of grooves on the surface of said magnetic circuit structure for sliding contact with the recording medium, said grooves extending in an oblique direction relative to the sliding direction in parallel with each other at constant pitches; and
(c) a third step of cutting said magnetic circuit structure along cutting lines extending in the sliding direction and crossing said second magnetic gap in the alternate grooves among said plurality of grooves, thereby obtaining a plurality of magnetic head chips.

12. A method according to claim 11, wherein said cutting lines are arranged to cross said first magnetic gap on alternate protruding parts among a plurality of protruding parts formed between said plurality of grooves.

* * * * *